(12) United States Patent
Haner et al.

(10) Patent No.: US 6,593,407 B2
(45) Date of Patent: Jul. 15, 2003

(54) HOT MELT ADHESIVE COMPOSITION

(75) Inventors: Dale L. Haner, Ringwood, NJ (US); Brian Carillo, Jersey City, NJ (US); Justin Mehaffy, Flemington, NJ (US)

(73) Assignee: National Starch and Chemical Investment Holding Corporation, New Castle, DE (US)

( * ) Notice: Subject to any disclaimer, the term of this patent is extended or adjusted under 35 U.S.C. 154(b) by 30 days.

(21) Appl. No.: 09/777,281

(22) Filed: Feb. 6, 2001

(65) Prior Publication Data

US 2002/0146526 A1 Oct. 10, 2002

(51) Int. Cl.⁷ .............................. C08L 93/04
(52) U.S. Cl. .................. 524/272; 524/271; 526/149
(58) Field of Search ................. 524/270, 271, 524/272, 273, 274; 525/149

(56) References Cited

U.S. PATENT DOCUMENTS 6,022,947 A * 2/2000 Frihart et al. ............... 530/212

* cited by examiner

*Primary Examiner*—Peter Szekely
(74) *Attorney, Agent, or Firm*—Cynthia L. Foulke

(57) ABSTRACT

A low application temperature, high heat resistant hot melt adhesive comprising an adhesive polymer and a modified rosin and/or modified terpene which has a molecular weight to softening point ratio of less that about 10. The adhesive is particularly well-suited for hot filled packaging applications.

16 Claims, No Drawings

HOT MELT ADHESIVE COMPOSITION

FIELD OF THE INVENTION

The invention relates to a low application temperature hot melt adhesive composition possessing high heat resistance, fast set speed and good cold adhesion.

BACKGROUND OF THE INVENTION

Hot melt adhesives are widely used for various commercial applications such as product assembly and packaging, including cardboard case sealing and carton closing operations. Such hot melt adhesives are applied to a substrate while in its molten state and cooled to harden the adhesive layer.

Most commercially available hot melt adhesives require temperatures of 350° F. (177° C.) or greater to ensure complete melting of all the components and also to achieve a satisfactory application viscosity. While adhesive formulations that can be applied at temperatures below 300° F. (121° C.) can be prepared using low molecular weight components or a high wax content, application viscosity and adhesive properties suffer. While softer or more amorphous components may be added in order to improve adhesion, these components reduce the effective heat resistance.

The use of a hot melt adhesive with exceptionally high heat resistance and, in addition, good cold resistance is important in hot filled packaging applications, e.g., sealing and closing operations for cartons, cases or trays used for packaging molten cheese, yogurt or freshly baked goods, which are subsequently subjected to refrigeration or freezing.

There continues to be a need in the art for improved hot melt adhesives that can be applied at low temperatures, possess high heat resistance and good cold adhesion.

SUMMARY OF THE INVENTION

The invention provides a hot melt adhesive comprising an adhesive polymer and a tackifer. Tackifiers required for use in the practice of the invention are modified rosins and/or modified terpenes, specifically modified rosins and/or terpenes having a molecular weight to softening point ratio of less than about 10, preferably less than about 8.5, typically between about 2.0 and 8.5. The adhesives of the invention exhibit high heat resistance and good cold resistance.

One aspect of the invention is directed to a hot melt adhesive comprising an adhesive copolymer, and a modified rosin and/or modified terpene having a molecular weight to softening point ratio of from about 2 to about 10, preferably less than about 8.5. The adhesive compositions of the invention will also preferably comprise a wax. Preferred modified rosins for use in the practice of the invention are phenolic-modified rosin. Preferred modified terpenes for use in the practice of the invention are terpene phenolics.

In a preferred embodiment, the adhesive copolymer comprises at least one ethylene copolymer. A particularly preferred embodiment comprises an ethylene n-butyl acrylate copolymer and/or an ethylene vinyl acetate copolymer.

Another aspect of the invention is directed to a method of sealing and/or making or forming a case, a carton, a tray, a box or a bag. These methods comprise using a hot melt adhesive comprising an adhesive polymer and a modified rosin and/or a modified terpene having a molecular weight to softening point ratio of less than about 10.

Still another aspect of the invention is directed to an article of manufacture comprising an adhesive polymer and a modified rosin and/or a modified terpene having a molecular weight to softening point ratio of less than about 10. In one embodiment, the article of manufacture is a carton, case, tray or bag used for packaging products, said carton, case, tray or bag formed using a hot melt adhesive comprising an adhesive polymer and a modified rosin and/or a modified terpene having a molecular weight to softening point ratio of less than about 10. The packaged article may comprise cardboard or paperboard which has been adhered by such hot melt adhesives. In another embodiment, the adhesive is pre-applied to the article, e.g., carton, case, tray or bag during the manufacture thereof, and prior to packaging of a product.

Yet another aspect of the invention is directed to packaged articles contained within a carton, case, tray or bag, in particular packaged food, wherein the carton, case, tray or bag comprises an adhesive containing an adhesive polymer and a modified rosin and/or a modified terpene having a molecular weight to softening point ratio of less than about 10.

Another aspect of the invention is directed to a process for bonding a substrate to a similar or dissimilar substrate comprising applying to at least one substrate a molten hot melt adhesive composition and bonding said substrates together, said hot melt adhesive comprising an adhesive copolymer and a modified rosin and/or modified terpene having a molecular weight to softening point ratio of less than about 10.

Still another aspect of the invention is directed to a method of increasing resistance of a hot melt adhesive to heat and cold comprising using a tackifer comprising at least one modified rosin and/or modified terpene which has a molecular weight to softening point ratio of less than about 10.

DETAILED DESCRIPTION OF THE INVENTION

All documents cited herein are incorporated in their entireties by reference.

The invention is directed to a low application temperature, high heat resistant hot melt adhesive comprising an adhesive polymer, a modified rosin and/or modified terpene, wherein the tackifier has a molecular weight to softening point ratio of from about 2 to less than about 10, preferable less than about 8.5 down to about 4, and optionally a wax. The adhesive of the invention is particularly well-suited for hot filled packaging applications.

It has now been discovered that modified rosins and modified terpenes, having a molecular weight to softening point ratio of less than about 10, when used as tackifer, alone or in combination, in a hot melt adhesive provides hot melt adhesives which can be applied at low temperature and exhibit high heat resistance and good cold resistance. A preferred modified rosin for use in the practice of the invention is a phenolic-modified rosin. A preferred modified terpene for use in the practice of the invention is a terpene phenolic. The phenol moiety may be substituted or unsubstituted.

Rosins useful in the preparation of modified rosin may be any standard material of commerce known as "rosin", or a feedstock containing rosin. Rosin is mainly a mixture of $C_{20}$, tricyclic fused-ring, monocarboxylic acids, typified by pimaric and abietic acids, which are commonly referred to as "resin acids." Any one or more of the $C_{20}$ cyclic carboxylic acid-containing isomers present in rosin may be used.

Rosin which is suitable for use can be obtained from many sources, and can have a wide range of purities. For example, wood rosin may be used, where wood rosin is obtained from Pinus stumps after harvesting the stumps, chipping the stumps into small chips, extracting the chips with hexane or higher-boiling paraffin, and distilling the hexane or paraffin to yield wood rosin. Gum rosin, which is the name given to rosin that is obtained after scoring a pine tree, collecting the exudate sap, and then distilling away the volatile components, may also be used. The rosin may be tall oil rosin, which is a by-product of the Kraft (i.e., sulfate) pulping process for making paper. According to the Kraft process, pinewood is digested with alkali and sulfide, producing tall oil soap and crude sulfate turpentine as by-products. Acidification of this soap followed by fractionation of the crude tall oil yields tall oil rosin and fatty acids. Depending on the fractionation conditions, the rosin may contain variable amounts of fatty acids. Preferably, the rosin used in the present invention contains at least 90 wt % resin acids, and less than 10 wt % fatty acids. Some rosin dimerization product, which may form during the fractionation process, may also be present in the tall oil rosin. A standard grade of rosin is available commercially from Union Camp Corporation (Wayne, N.J.) under the UNI-TOL® trademark. Gum rosin, including Chinese gum rosin, is another rosin which can be used to prepare modified rosins for use in the practice of the invention esters of the invention.

Essentially any reaction conditions recognized in the art for preparing modified rosin phenolic resins (including derivatives thereof) may be employed to prepare a modified rosin for use in the present invention. Phenolic-modified rosin esters are typically prepared by the reaction of rosin and a phenolic compound. This phenolic resin is then esterified with a polyhydric alcohol providing phenolic-modified rosin esters. Typically, the combinations of reactants are exposed to an elevated temperature in the range of 100–300° C. At these elevated temperatures, the reactants undergo covalent bond-forming reactions with other reactants, so that a resinous material is formed.

A phenolic compound has at least one hydroxyl group directly bonded to an aromatic ring. The parent phenolic compound is phenol itself. Other phenolic compounds are derivatives of phenol wherein 1 to 3 of the aromatic hydrogens are replaced with an equal number of substituents independently selected from hydroxyl; $C_1$–$C_{12}$ alkyl; $C_1$–$C_{12}$ alkyl substituted with 1 or 2 groups selected from hydroxyl and phenyl; phenyl; and phenyl substituted with 1 or 2 groups selected from hydroxyl and $C_1$–$C_{12}$ alkyl.

Specific derivatives of phenol include cresols (including the ortho, meta and para cresols), 1,3,5-xylenols, $C_{1-22}$ alkylphenol, iso-propylphenol, tert-butylphenol, amylphenol, octylphenol, nonylphenol, diphenylpropane, phenylphenol, resorcinol, cashew nutshell liquid, bisphenol-A and cumylphenol. Phenolic compounds having a single substituent in the para position (relative to the hydroxyl group) include p-tert-butylphenol, p-octylphenol and p-nonylphenol.

Reaction products of rosins and their methods of preparation are well known in the art. See, e.g., U.S. Pat. No. 2,007,983. Phenolic-modified rosin esters currently find widespread commercial use in offset printing inks as binders, see, e.g. Roger E. Burke, "Rosin-based Printing Inks", Naval Stores, Chapter 10. Pulp Chemicals Association (1989) and the prior art contains numerous descriptions of phenol-modified rosin esters useful in offset printing inks. Exemplary are U.S. Pat. Nos. 4,398,016 and 4,391,640, both of which describe methods of preparing phenolic-modified rosin esters.

Rosin esters (made without phenol) and terpene phenolics (made from terpenes and phenols) may also be used in the practice of the invention. Hydrogenated derivatives of phenolic modified terpene resins, for example, may be prepared from the condensation, in an acidic medium, of a bicyclic terpene and a phenol are also useful, as long as the molecular weight to softening point ratio is less that about 10. It is important to the practice of the invention that the modified rosin/modified terpene has a molecular weight to softening point ratio of less that about 10.

A compatible, low application temperature hot melt adhesive having high heat resistance and good cold adhesion may be prepared using modified rosins and/or terpenes having a molecular weight to softening point of less than about 10. It has now been discovered that to achieve high temperature resistance and low application temperature the use of a modified rosin/terpene having a high softening point is needed. However, the molecular weight of the modified rosin/terpene must be low enough to achieve the desired low application temperature. The ratio of molecular weight to softening point represents a practical measure of a resins ability to provide a low formulated viscosity (via low molecular weight) but contribute to improved heat resistance (via high softening point).

Whether a particular modified rosin or terpene meets the criteria for usefulness in the practice of the invention (i.e. that it has the required molecular weight to softening point ratio) can be easily determined by the skilled practitioner. The molecular weight average, Mw, is measured by dissolving the material in a suitable solvent, e.g., tetrahydrofuran, and subjecting a sample of that solution to Gel Permeation Chromatography (GPC) analysis. The retention time and elution profile of polystyrene standards of known molecular weight (commercially available from many Chromatography supply houses, e.g., Supelco, Inc. or Waters Associates) provides weight average molecular weight data in grams/mole. The softening point is measured by a Mettler FP90 Central Processor and a Mettler FP83 HT Dropping Point cell with a softening point ring, and are reported in degrees centigrade (° C.). The molecular weight to softening point ratio is the molecular weight of the modified rosin/modified terpene divided by its softening point.

Commercially available phenol-modified rosins which can be used to practice the invention include Tamanol 803L, available from Arakawa Chemical Company, Tamanol 901, also available from Arakawa Chemical Company, and Phenolite KC4001, available from Kangham Chemical Co. LTD., Seoul, Korea. The molecular weight, softening point and molecular weight to softening point ratio is set forth in Table 1.

The modified rosin and/or modified terpene component will typically be used in amounts of from about 10 to about 60 weight percent, by weight of the adhesive composition.

Any base polymer suitable for use in formulating hot melt adhesives, as are well known to those skilled in the art may be used in the practice of the invention. Such polymers include amorphous polyolefins, ethylene-containing polymers and rubbery block copolymers, as well as blends thereof. In a preferred embodiment, the adhesive comprises at least one ethylene copolymer, and may comprise a blend of two or more polymers. The term ethylene copolymer, as used herein, refers to homopolymers, copolymers and terpolymers of ethylene. The polymer component will usually be present in an amount of from about 10% to about 60%, more preferably from about 20% to about 45%, more preferably from about 25% to about 35%. Examples of ethylene copolymers include copolymers with one or more polar monomers which can copolymerize with ethylene, such as vinyl acetate or other vinyl esters of monocarboxylic acids, or acrylic or methacrylic acid or their esters with methanol, ethanol or other alcohols. Included are ethylene vinyl acetate, ethylene methyl acrylate, ethylene n-butyl acrylate, ethylene acrylic acid, ethylene methacrylate and mixtures and blends thereof. Other examples include but are not limited to recycled polyethylene terphthalate and polyethylene, ethylene/α-olefin interpolymers, poly-(butene-1-co-ethylene), atactic polypropylene, low density polyethylene, homogenous linear ethylene/α-olefin copolymers, lower melt index n-butyl acrylate copolymers, ethylene vinyl ester copolymers). Random and block copolymers, as well as blends thereof may be used in the practice of the invention.

Preferred adhesives for use in the practice of the invention comprise at least one ethylene n-butyl acrylate copolymer. Even more preferred are adhesives comprising ethylene n-butyl acrylate and at least one additional polymer. The at least one additional polymer is desirably also an ethylene copolymer, but other types of polymers may also be used. The additional polymers include, but are not limited to, ethylene vinyl acetate, ethylene methyl acrylate, ethylene-ethyl acrylate, ethylene acrylic acid copolymers, polyethylene, polypropylene, poly(butene-1-co-ethylene) polymers and low molecular weight and/or low melt index ethylene n-butyl acrylate copolymers. When such additional polymer is present, it is present in amounts of up to about 25 weight percent, usually from about 5 to about 25 weight percent, preferably up to about 20 weight percent and most preferable from about 2 weight percent up to about 15 weight percent by weight of the adhesive composition.

The desired polar monomer content in the ethylene copolymer is generally from about 1 to about 60 wt %, preferably 15 to 45 wt %, more preferably over 25 wt %. The ethylene copolymer preferably has a melt index of from about 10 to about 5000 grams/10 minutes.

Particularly preferred adhesives comprise an ethylene n-butyl acrylate copolymer containing up to about 45% by weight, typically 15 to 35% of n-butyl acrylate and has a melt index of at least about 900. Most preferably, the copolymer also comprises up to about 25% by weight of ethylene vinyl acetate. Even more preferably ethylene vinyl acetate component comprises less than about 30% vinyl acetate.

Ethylene n-butyl acrylate copolymers are available from Elf Atochem North America, Philadelphia, Pa. under the tradename Lotryl®, from Exxon Chemical Co. under the tradename Enable® (e.g., EN33330 which has a melt index of about 330 grams/10 minutes and an n-butyl acrylate content of about 33% by weight in the copolymer and EN33900 which has a melt index of about 900 and an n-butyl acrylate content of about 35% by weight) and from Millennium Petrochemicals under the tradename Enathene® (e.g., EA 89822 which has a melt index of about 400 grams/10 minutes and a n-butyl acrylate content of about 35% by weight in the copolymer).

Ethylene vinyl acetate copolymers are available from DuPont Chemical Co., Wilmington, Del. under the tradename Elvax® (e.g., Elvax® 210 which has a melt index of 400 grams/10 minutes and a vinyl acetate content of 28% by weight in the copolymer, Elvax® 205W which has a melt index of 800 and a vinyl acetate content of about 28% by weight in the copolymer and Elvax® 410 which has a melt index of 500 and a vinyl acetate content of about 18% by weight). Other ethylene vinyl acetate copolymers are available from Exxon Chemical Co. under the tradename Escorene® (e.g., UL 7505) and also from Millennium Petrochemicals, Rolling Meadows, Ill., under the tradename Ultrathene® (e.g., UE 64904) and AT® copolymers available from AT Polymers & Film Co., Charlotte, N.C. (e.g., AT® 1850M).

Ethylene methyl acrylate copolymers are also useful and are available from Exxon Chemical Co. under the tradename Optema® (e.g., Optema® XS 93.04 which has a melt index of about 270 grams/10 minutes and a methyl acrylate content of about 20% by weight in the copolymer).

Other useful polymers include ethylene n-butyl acrylate carbon monoxide copolymers from DuPont under the tradename Elvaloy®, amorphous polyalphaolefin polymers from Rexene Products Co. in Dallas, Tex. under the tradename Rextac®, from Eastman Chemical Co. under the tradename Eastoflex®, from Creanova under the tradename Vestoplast®, and polyethylene homopolymers from Eastman Chemical Co. under the tradename Epolene®. Other useful polymers include Exact® 5008, an ethylene-butene polymer; Exxpol® SLP-0394, an ethylene-propylene polymer; Exact® 3031, an ethylene-hexene polymer all available from Exxon Chemical Co.; and Insight® SM-8400, an ethylene-octene polymer available from Dow Chemical Co. Midland, Mich. Ethylene methyl acrylate polymers containing from about 10 to about 28 weight % by weight methyl acrylate and ethylene acrylic acid copolymers having acid numbers of 25 to 150 may also be used in the practice of the invention.

Waxes suitable for use in the present invention include paraffin waxes, microcrystalline waxes, high density low molecular weight polyethylene waxes, by-product polyethylene waxes, Fischer-Tropsch waxes, oxidized Fischer-Tropsch waxes and functionalized waxes such as hydroxy stearamide waxes and fatty amide waxes. It is common in the art to use the terminology synthetic high melting point waxes to include high density low molecular weight polyethylene waxes, by-product polyethylene waxes and Fischer-Tropsch waxes. Modified waxes, such as vinyl acetate modified and maleic anhydride modified waxes may also be used. The wax component is utilized at levels of greater than about 10 weight percent, typically about 20 to 40 weight percent, by weight of the adhesive.

The paraffin waxes useful herein are those having a ring and ball softening point of about 55° C. to about 85° C. Preferred paraffin waxes are Okerin® 236 TP available from Astor Wax Corporation, Doraville, Ga.; Penreco® 4913 available from Pennzoil Products Co., Houston, Tex.; R-7152 Paraffin Wax available from Moore & Munger, Shelton, C N.; and Paraffin Wax 1297 available from International Waxes, Ltd in Ontario, Canada. Particularly preferred are paraffin waxes having melting points in the range of about 130 to 165° F., such as, for example, Pacemaker available from Citgo, and R-2540 available from Moore and Munger; and low melting point synthetic Fischer-Tropsch waxes having a melting point of less than about 180° C. The most preferred wax is paraffin wax with a melting point of 150° C. Other paraffinic waxes include waxes available from C P Hall under the product designations 1230, 1236, 1240, 1245, 1246, 1255, 1260, & 1262. C P Hall 1246 paraffinic wax is available from C P Hall (Stow, Ohio).

The microcrystalline waxes useful here are those having 50 percent by weight or more cyclo or branched alkanes with a length of between 30 and 100 carbons. They are generally less crystalline than paraffin and polyethylene waxes, and have melting points of greater than about 70° C. Examples include Victory® Amber Wax, a 70° C. melting point wax available from Petrolite Corp. located in Tulsa, Okla.; Bareco® ES-796 Amber Wax, a 70° C. melt point wax available from Bareco in Chicago, Ill.; Okerin® 177, an 80° C. melt point wax available from Astor Wax Corp.; Besquare® 175 and 195 Amber Waxes and 80° C. and 90° C. melt point microcrystalline waxes both available from Petrolite Corp. in Tulsa, Okla.; Indramic® 91, a 90° C. melt point wax available from Industrial Raw Materials located in Smethport, Pa.; and Petrowax® 9508 Light, a 90° C. melt point wax available from Petrowax Pa., Inc. located in New York, N.Y.

Exemplary high density low molecular weight polyethylene waxes falling within this category include ethylene homopolymers available from Petrolite, Inc. (Tulsa, Okla.) as Polywax™ 500, Polywax™ 1500 and Polywax™ 2000. Polywax™ 2000 has a molecular weight of approximately 2000, an Mw/Mn of approximately 1.0, a density at 16° C. of about 0.97 g/cm.sup.3, and a melting point of approximately 126° C.

The adhesives of the present invention preferably also contain a stabilizer or antioxidant. These compounds are added to protect the adhesive from degradation caused by reaction with oxygen induced by such things as heat, light, or residual catalyst from the raw materials such as the tackifying resin.

Among the applicable stabilizers or antioxidants included herein are high molecular weight hindered phenols and multifunctional phenols such as sulfur and phosphorous-containing phenol. Hindered phenols are well known to those skilled in the art and may be characterized as phenolic compounds which also contain sterically bulky radicals in close proximity to the phenolic hydroxyl group thereof. In particular, tertiary butyl groups generally are substituted onto the benzene ring in at least one of the ortho positions relative to the phenolic hydroxyl group. The presence of these sterically bulky substituted radicals in the vicinity of the hydroxyl group serves to retard its stretching frequency, and correspondingly, its reactivity; this hindrance thus providing the phenolic compound with its stabilizing properties. Representative hindered phenols include; 1,3,5-trimethyl-2, 4,6-tris-(3,5-di-tert-butyl-4-hydroxybenzyl)-benzene; pentaerythrityl tetrakis-3(3,5-di-tert-butyl-4-hydroxyphenyl)-propionate; n-octadecyl-3(3,5-d i-tert-butyl-4-hydroxyphenyl)-propionate; 4,4'-methylenebis (2,6-tert-butyl-phenol); 4,4'-thiobis (6-tert-butyl-o-cresol); 2,6-di-tertbutylphenol; 6-(4-hydroxyphenoxy)-2,4-bis(n-octyl-thio)-1,3,5 triazine; di-n-octylthio)ethyl 3,5-di-tert-butyl-4-hydroxy-benzoate; and sorbitol hexa[3-(3,5-di-tert-butyl-4-hydroxy-phenyl)-propionate].

The performance of these antioxidants may be further enhanced by utilizing, in conjunction therewith, known synergists such as, for example, thiodipropionate esters and phosphites. Distearylthiodipropionate is particularly useful. These stabilizers, if used, are generally present in amounts of about 0.1 to 1.5 weight percent, preferably 0.25 to 1.0 weight percent.

Such antioxidants are commercially available from Ciba-Geigy, Hawthorne, N.Y. and include Irganox® 565, 1010 and 1076 which are hindered phenols. These are primary antioxidants which act as radical scavengers and may be used alone or in combination with other antioxidants such as phosphite antioxidants like Irgafos® 168 available from Ciba-Geigy. Phosphite catalysts are considered secondary catalysts and are not generally used alone. These are primarily used as peroxide decomposers. Other available catalysts are Cyanox® LTDP available from Cytec Industries in Stamford, Conn., and Ethanox® 1330 available from Albemarle Corp. in Baton Rouge, La. Many such antioxidants are available either to be used alone or in combination with other such antioxidants. These compounds are added to the hot melts in small amounts and have no effect on other physical properties. Other compounds that could be added that also do not affect physical properties are pigments which add color, or fluorescing agents, to mention only a couple. Additives like these are known to those skilled in the art.

Depending on the contemplated end uses of the adhesives, other additives such as plasticizers, pigments and dyestuffs conventionally added to hot melt adhesives may be included. In addition, small amounts of additional tackifiers and/or waxes such as microcrystalline waxes, hydrogenated castor oil and vinyl acetate modified synthetic waxes may also be incorporated in minor amounts, i.e., up to about 10 weight percent by weight, into the formulations of the present invention.

The adhesive compositions of the present invention are prepared by blending the components in the melt at a temperature of above about 120° C., typically at about 150° C. until a homogeneous blend is obtained, usually about two hours is sufficient. Various methods of blending are known in the art and any method that produces a homogeneous blend is satisfactory.

The resulting adhesives are characterized by a viscosity less than about 3000 cps at 150° C. They may be applied low temperatures to provide superior adhesive bonds even when exposed to a wide variety of temperature conditions. By low application temperature means that the adhesive is applied at temperatures below about 150° C., preferable below about 140° C., more preferably below about 130° C. The adhesives possess excellent heat resistance and cold resistance. High heat resistance means the ability to maintain a fiber tearing bond at elevated temperatures of about 140° F. Cold resistance is the ability to maintain a high strength bond in the cold with no tendency to fracture at 40° F. (4° C.).

The hot melt adhesives of the invention find use in packaging, converting, bookbinding, bag ending and in the nonwovens markets. The adhesives find particular use as case, carton, and tray forming, and as sealing adhesives, including heat sealing applications, for example in the packaging of cereals, cracker and beer products. Encompassed by the invention are containers, e.g., cartons, cases, boxes, bags, trays and the like, wherein the adhesive is applied by the manufacturer thereof prior to shipment to the packager. Following packaging, the container is heat sealed.

The hot melt adhesives of the present invention are particularly useful in case sealing applications where exceptionally high heat resistance in addition to cold resistance is important, i.e., in hot filled packaging applications; e.g. sealing and closing operations for cartons, cases, or trays used in packaging molten cheese, yogurt or freshly baked goods which are subsequently subjected to refrigeration or freezing, and for corrugated cases, which are often subjected to high stresses and adverse environmental conditions during shipping and storage.

The substrates to be bonded include virgin and recycled kraft, high and low density kraft, chipboard and various types of treated and coated kraft and chipboard. Composite materials are also used for packaging applications such as for the packaging of alcoholic beverages. These composite materials may include chipboard laminated to an aluminum foil which is further laminated to film materials such as polyethylene, mylar, polypropylene, polyvinylidene chloride, ethylene vinyl acetate and various other types of films. Additionally, these film materials also may be bonded directly to chipboard or kraft. The aforementioned substrates by no means represent an exhaustive list, as a tremendous variety of substrates, especially composite materials, find utility in the packaging industry.

Hot melt adhesives for packaging are generally extruded in bead form onto a substrate using piston pump or gear pump extrusion equipment. Hot melt application equipment is available from several suppliers including Nordson, ITW and Slautterback. Wheel applicators are also commonly used for applying hot melt adhesives, but are used less frequently than extrusion equipment.

In the following examples, which are provided for illustrative purposes only, all parts are by weight and all temperatures in degrees Celsius unless otherwise noted.

EXAMPLES

In the examples, the tests used to evaluated the adhesive properties were conducted as follows.

Melt viscosities of the hot melt adhesives were determined on a Brookfield Model RVT Thermosel viscometer using a number 27 spindle.

Acid number was measured by techniques known in the art. See, e.g., ASTM D-465 (1982).

Softening points were measured with a Mettler FP90 Central Processor and a Mettler FP83 HT Dropping point cell with a softening point ring, and are reported below in degrees centigrade (° C.). A heating rate of between about 1° C. and about 2° C. per minute was used.

Clarity was determined qualitatively by heating the adhesive in a glass jar to 121° C. preferably (or to 162° C. if hazy) and placing a thermometer in the glass jar. If the thermometer can be fully seen, the adhesive was determined to be clear; if it could not, the thermometer was gradually moved toward the front of the glass jar and a comparative reading was assigned.

Adhesion at various temperatures, as noted, was determined by applying a ½ inch wide bead of adhesive widthwise at 121° C. to a 2 inch by 3 inch piece of substrate (as indicated) and immediately bringing a second piece of board into contact. A 200 gram weight was immediately placed on the construction. The boardstock was 275 pound burst strength corrugated board. The bonded specimens were placed in an oven at 55° C. and 60° C., and in freezers at 4.4° C., −6.7° C., and −17.8° C. The bonds were separated by hand and a determination made as to the type of failure. Fiber tearing (FT) and non-fiber tearing bonds (NFT) were noted. "Full" as used in the examples herein refers to 95 to 100% fiber tear. "Moderate" refers to 50 to 95% fiber tear. "Slight" refers to 5 to 50% fiber tear; and "None" refers to 0 to 5% fiber tear. The character of the bond failure was also observed and, in the case of bonds that exhibited a brittle crack or shattering of the adhesive interface, this characteristic was noted as "cold crack".

Heat stress was measured by forming a composite construction of adhesive (2×½" compressed) between two pieces of corrugated of specific dimensions. The adhesive bead forming this composite is then placed under approximately 2 pounds of cantilever stress for 24 hours at elevated temperatures. The maximum temperature at which this construction remains in tact for at least 24 hours is then noted.

Cloud point is determined by heating the adhesive blends to 150° C. and applying a small bead (approximately 1 gram) of the molten adhesive to the bulb of an ASTM thermometer. The temperature at which the molten adhesive clouds over is then noted. These measures of cloud point provide an indication of a hot melt's overall compatibility, i.e., the compatibility of the individual ingredients with each other. Products that show cloud points near or at the softening point of the wax used in the formulation reflect an overall compatible product. The cloudiness that develops as the material cools is the result of the developing crystallinity of the waxy component (causing refraction of light passing through the sample). Systems that possess cloud points much greater than the softening point of the wax exhibit a micro separation changing the refraction index of the molten adhesive. Incompatibility is defined as a cloud point of greater than or equal to 250° F. The practical significance of products with high cloud points are as follows:

(1) Poor inherent compatibility with a tendency to phase separation upon prolonged heating, and heating and cooling cycling such as is experienced in commercial operations.

(2) Poor flow properties resulting in "stringing" from rapid fire, air or electric actuated nozzle equipment.

Adhesive set time was determined in the following manner using 50 pound Kraft paper and an adhesive tester that simulates a case sealing line: Kraft samples 2 inches by 2 inches were placed in the grips of the tester. The bottom specimen (2'×4') was moved forward at a constant speed under the melt nozzle applicator for the application of the adhesive bead and was stopped directly under the top specimen. The vertical cylinder pressure was preset at 20 psi and, after a predetermined open time, moved the top specimen downward to contact the lower specimen. Contact was maintained for a given compression time and force after which the top substrate was separated from the lower substrate by reversal of the air flow operating the vertical cylinder. The adhesive bead width was adjusted by nitrogen pressure to give a width of ⅛ inch following compression. Several tests were carried out under the following conditions: Open time 1 sec, Vertical Cylinder Pressure 20 psi. The shortest time required to obtain 80% of the adhesive bonds having immediate fiber tearing bonds was reported as set time.

Thermal stability of the adhesive blends was determined in the following manner: 100 grams of adhesive was placed in a clean 8 oz. glass jar and covered with aluminum foil. The jars were then placed in forced-draft ovens at 121° C. or other relevant temperatures and aged for 24, 48, 72 and/or 100 hours. After these time intervals the specimen was analyzed for color change and presence of char and non-thermoplastic material (skin or gel) and the viscosity measured. Unusual behavior such as separation and lack of clarity were also noted.

Example 1

The physical properties of various modified phenol rosins were determined and are shown in Table 1.

A comparative Rosin ("Rosin A"), supplied by Arizona Chemical Company was prepared using a light colored rosin phenolic of the type contemplated for use in the invention described in U.S. Pat. No. 6,022,947.

Rosins B, C and D where prepared using a phenol modified rosin of the type required for use in the subject invention. Rosin B is a light phenol modified gum rosin, commercially available under the tradename Tamanol 803L from Arakawa Chemical Company. It is not partially esterified with either pentaerythritol or glycerol. Rosin C is a rosin phenolic not esterified with glycerol or pentaerythritol, commercially available under the tradename Phenolite KC4001 from Kangnam Chemical Co., LTD, Seoul, Korea. Rosin D is a rosin phenolic not esterified with glycerol or pentaerythritol, commercially available under the tradename Tamanol 901 from Arakawa Chemical Company.

TABLE 1

| Resin | Comparative Rosin A | Rosin B | Rosin C | Rosin D |
|---|---|---|---|---|
| Acid Number, mg/KOH | 44 | 45 | 63 | 65 |
| Gardner Color | 7 | 6+/7− | 8+ | 8+ |
| R&B SP, ° C. | 135° C. | 155° C. | 152° C. | 135° C. |
| Viscosity (cps) | | | | |
| @140° C. | — | — | — | — |
| @190° C. | 2050 | 2700 | 3050 | 1900 |
| Mw/SP Ratio | 15 | 7.00 | 7.07 | 5.85 |
| Mw | 2050 | 1086 | 1075 | 790 |
| Mn | 1066 | 744 | 720 | 585 |
| Mw/Mn | 1.9 | 1.5 | 1.49 | 1.35 |

Example 2

In the examples, all adhesive formulations were prepared using the following equipment: a bench top glascol mantle; single blade mixing shaft; electric variable speed motor; quart sized cans; and electronic temperature controller. The adhesives were prepared in 200 gram batches, according to the formulations set forth in Table 2. The quantities recited in Table 2 refer to parts by weight of each component based on ~100.5 parts used to prepare the formula.

The adhesives were compounded by first adding all the wax (paraffinic), antioxidant (IRGANOX 1010) and polymer (ENABLE) to the quart sized can. The can was placed in a glascol heating mantle and allowed to heat up to 150° C. with constant agitation from the mixer. As soon as the solid materials melted and appeared homogeneous at 150° C., the resin was slowly added. The resins (rosin phenolic or rosin ester) were added slowly so as not to agglomerate together or lower the mixing temperature too severely. Once the resins were completely dissolved and had been thoroughly mixed, the adhesive was poured out into 8 ounce jars and allowed to cool. The total time for the adhesive preparation was ~1 to 3 hours for the material to be homogeneous. However if the material did not appear homogeneous and clear but cloudy, another additional 45 minutes of mix time was allowed at 165° C. If the sample was still cloudy and hazy, the mixing was stopped and the sample poured out and still tested.

TABLE 2

Ethylene n-butyl acrylate formulations with rosin phenolics

| Formulation # | #1 Rosin B | #2 Rosin D | #3 Rosin A | #4 Rosin B | #5 Rosin D | #6 Rosin A |
|---|---|---|---|---|---|---|
| ENABLE 33900 33% BA, 900Ml) | 35 | 35 | 35 | 35 | 35 | 35 |
| Tamanol 803L | 35 | — | — | 35 | — | — |
| Tamanol 901 | — | 35 | — | — | 35 | — |
| Comparative Rosin A | — | — | 35 | — | — | 35 |
| 150° F. paraffin wax | 30 | 30 | 30 | — | — | — |

TABLE 2-continued

Ethylene n-butyl acrylate formulations with rosin phenolics

| Formulation # | #1 Rosin B | #2 Rosin D | #3 Rosin A | #4 Rosin B | #5 Rosin D | #6 Rosin A |
|---|---|---|---|---|---|---|
| 163° F. paraffin wax | — | — | — | 30 | 30 | 30 |
| Irganox 1010 | 0.5 | 0.5 | 0.5 | 0.5 | 0.5 | 0.5 |

Example 3

Adhesive properties of formulations 1–6 were analyzed. The results are shown in Table 3.

TABLE 3

Performance properties of rosin phenolics in ethylene n-butyl acrylate

| Formulation # | #1 Rosin B | #2 Rosin D | #3 Rosin A | #4 Rosin B | #5 Rosin D | #6 Rosin A |
|---|---|---|---|---|---|---|
| Heat Stress, ° F. | 125 | 120 | 120 | 120 | 125 | 115 |
| Viscosity @ 250° F., cps | 1485 | 1435 | 1630 | 1745 | 1775 | 1990 |
| Clarity | Clear | Clear | Cloudy | Clear | Clear | Cloudy |
| Cloud Pt, ° F. | 150 | 180 | >325 | 160 | 170 | >325 |
| Adhesion to Corrugated | | | | | | |
| 130° F. | Full | Full | Full | Full | Full | Full |
| RT | Full | Full | Full | Full | Full | Full |
| 40° F. | Full | Full | Full | Full | Full | Full |
| 20° F. | Full | Full | Full | Full | Full | Full |

The results presented in Table 3 illustrate the differences in compatibility between the rosin phenolics used to prepare the adhesives of the invention versus the Comparative Rosin A sample. Both of the Tamanol 803L (Rosin B) and 901 (RosinD) formulations were clear with low cloud points. Although the Comparative Rosin A has the same softening point as the Tamanol 901 sample, it has a higher melt viscosity.

The data demonstrates that an adhesives made with a prior art light colored rosin phenolic has poor heat stress values and poor adhesion performance in both cold and high heat conditions as compared to adhesives made in accordance with the invention. In contrast to the adhesives prepared in accordance with the invention, adhesives made with low softening point rosin phenolics of the prior art exhibit poor heat resistance, poor cold temperature adhesion with severe cold crack, longer set times that may lead to pop opens on line and poor fiber tear results at elevated temperatures.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

What is claimed is:

1. A high heat resistant, low application temperature adhesive comprising an adhesive polymer and a modified rosin having a weight average molecular weight to softening point ratio of less than about 10.

2. The adhesive of claim 1 wherein the modified rosin has a weight average molecular weight to softening point ratio of less than about 8.5.

3. The adhesive of claim 1 wherein the modified rosin is a phenolic-modified rosin.

4. The adhesive of claim 1 further comprising a wax.

5. The adhesive of claim 1 wherein the adhesive polymer comprises at least one ethylene copolymer.

6. The adhesive of claim 5 comprising at least one ethylene n-butyl acrylate copolymer.

7. The adhesive of claim 5 which comprises from about 10 to about 60% by weight of an ethylene n-butyl acrylate copolymer.

8. The adhesive of claim 7 wherein the ethylene n-butyl acrylate copolymer contains from about 15 to about 45% by weight n-butyl acrylate having a melt index of at least about 900 grams/10 minutes.

9. The adhesive of claim 1 comprising from about 10 to about 60% by weight of the modified rosin.

10. The adhesive of claim 4 wherein the wax is a paraffin or a microcrystalline wax.

11. The adhesive of claim 4 comprising from about 10 to 50% by weight of the wax.

12. The adhesive of claim 6 further comprising ethylene vinyl acetate.

13. The adhesive of claim 12 comprising up to about 35% by weight ethylene vinyl acetate.

14. The adhesive of claim 13 comprising from about 5 to about 25% by weight ethylene vinyl acetate.

15. A method of sealing and/or forming a case, carton, tray, bag or book comprising applying a hot melt adhesive comprising an adhesive polymer and a modified rosin having a weight average molecular weight to softening point ratio of less than about 10 to seal and/or form the case, carton, tray, bag or book.

16. A process for bonding a substrate to a similar or dissimilar substrate comprising applying to at least one substrate a molten hot melt adhesive composition and said substrate together, said hot melt adhesive comprising an adhesive copolymer and a modified rosin having a weight average molecular weight to softening point ratio of less than about 10.

* * * * *